Sept. 13, 1938.    H. J. H. WASSELL    2,129,803
THERMOSTATICALLY CONTROLLED APPARATUS
Filed Nov. 21, 1934
*Fig. 1*
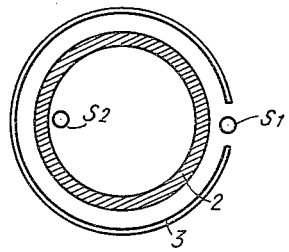
*Fig. 2*    *Fig. 3*    *Fig. 4*
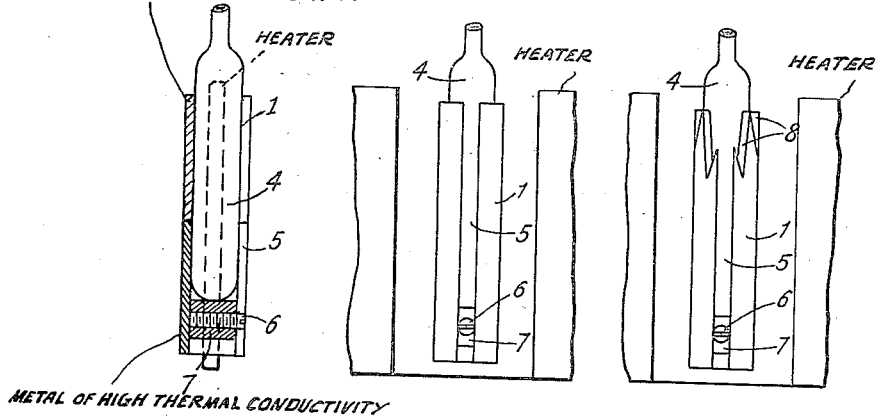
*Fig. 5*
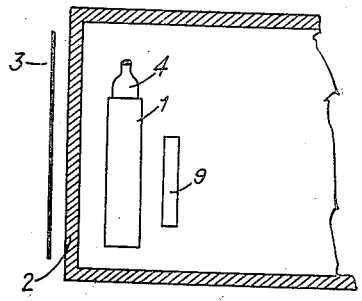
INVENTOR
HAROLD J. H. WASSELL
BY
ATTORNEY Patented Sept. 13, 1938

2,129,803

UNITED STATES PATENT OFFICE 2,129,803

THERMOSTATICALLY CONTROLLED APPARATUS

Harold Joseph Hughes Wassell, Chelmsford, England, assignor to Radio Corporation of America, a corporation of Delaware Application November 21, 1934, Serial No. 754,074
In Great Britain December 14, 1933

4 Claims. (Cl. 236—1)

This invention relates to thermostatically controlled apparatus and more particularly to thermostatically controlled chambers wherein a chamber of good conducting material is electrically heated by heater means disposed around it and is sought to be maintained at a substantially constant temperature by means of a thermostatic device which is usually placed in proximity to the electrical heaters and is utilized to control by means of relay or thermionic device the heating current fed to said heating means, the chamber being as a rule lagged internally and externally.

If a thermostatically controlled arrangement of this kind be transferred from a position where there is one ambient temperature to a position where there is another it will generally be found that the temperature to which the thermostat controls the chamber will be shifted by a small amount in the temperature scale. This shift of temperature may be either positive or negative i. e., it may occur in the same direction as the change of ambient temperature or it may occur in the opposite direction, depending upon the details of construction and arrangement. The amount of change thus caused by a unit change of ambient temperature may be referred to as "the figure of merit" of the whole arrangement. As above stated, the figure of merit may be positive or negative and its occurrence is a well known phenomenon.

The object of the present invention is to provide means for controlling the figure of merit of a thermostatically controlled arrangement. The most important advantage of the invention is that it permits the figure of merit to be controlled to be substantially of zero value.

According to the main feature of this invention, the temperature responsive member by means of which the thermostatic control is effected in an arrangement of the general kind above described, is mounted in a container in thermal contact with or closely adjacent to and in good heat relationship with the heat conducting walls of the chamber whose temperature is to be controlled, said temperature responsive device being adjustably mounted in said container so that it may be enclosed therein to a predetermined and adjustable extent.

According to a further feature of this invention the thermostatic control member is, as before, mounted in thermal contact with or closely adjace to the heat conducting walls of the chamber whose temperature is to be controlled but instead of mounting said control member adjustably in a container so as to control the "balance of heat" thereto and thereby control the figure of merit, there is provided adjacent said control member a small auxiliary heater and means are provided for adjusting the heating effect thereof upon said control member so that in this way the required "figure of merit" control is obtained.

The invention is illustrated in the accompanying schematic drawing which shows various arrangements in which the invention is applied to a thermostatic arrangement wherein the thermal temperature responsive device is the bulb of a mercury contact thermometer as well known per se.

Referring now to the figures of the drawing, Figure 1 is a schematic general plan of a sleeve and thermostat arrangement, Figure 2 is an elevation partly in section of the sleeve and thermometer arrangement, Figure 3 is an elevation taken at right angles to the view of Figure 2, Figure 4 is an elevation similar to that of Figure 3, except that the lower portion of the sleeve is cut away, and Figure 5 is a sectional elevation of one side of a thermostatically controlled chamber. Referring now in detail to the figures of the drawing: A heat conducting metal sleeve or cylindrical housing 1 which is open at the top is mounted at some convenient point in contact with or closely adjacent the metallic walls 2 of the chamber to be controlled in temperature. For example, if the chamber is cylindrical, as shown in Figure 1, and is heated by an arrangement 3 of so-called heater mats which almost completely surround it, the sleeve may be conveniently positioned at $S_1$ (Figure 1) in the gap between the ends of the heat mat assembly, i. e. in contact with or closely adjacent the outside of the chamber wall at a point where there is no external heater mat. Of course, the invention is not limited to the positioning of the sleeve as just described; for example, the sleeve may be mounted in thermal contact or closely adjacent to the inside of the chamber wall at any convenient position such as $S_2$ (Figure 1). The sleeve is of sufficient diameter to house the bulb 4 of the mercury contact thermometer. The sleeve is provided with a slot 5 which is parallel to the sleeve axis and through which passes a locking screw 6, the locking screw screwing into a movable plunger 7 mounted within the sleeve and adapted to be slid along inside the said sleeve and locked in any desired position by means of the locking screw.

The bulb of the mercury contact thermometer is inserted into the sleeve through the open end and the said sleeve is at least of sufficient length to house the whole of the said bulb. It will be seen that with this arrangement the amount of bulb which is within the sleeve will depend upon the position of the plunger therein since the bottom of the bulb will rest upon this plunger. If the plunger is at the bottom of the sleeve the whole of the bulb will lie within the said sleeve whereas if it is half way up, approximately half of the bulb will lie within the sleeve and half will project.

The adjustment of the figure of merit of the whole arrangement is made by adjusting the position of the plunger and as this plunger is raised or lowered the balance between the heat gained by the thermometer bulb from the heaters and that lost from the said bulb is changed. It therefore is possible by adjusting the position of the plunger to make the figure of merit either positive or negative and, what is more important, it is possible to make the figure of merit approximate very closely to zero.

In many cases it will be found that the rate of change of the figure of merit with the position of the plunger is, with a arrangement as above described, too rapid to be practically convenient. This difficulty may be met, if desired, by providing the sleeve with what is in effect thermal graduation; for example, as shown in Figure 4, the upper portion of the sleeve may be serrated or provided with acute angled V-shaped cut away portions 8, the V's having their tops at the top of the sleeve and their vertical axes parallel to one another and to the general axis of the sleeve. Obviously there are numerous other methods of thermally graduating the sleeve and making the change of thermal gradient smaller and therefore the position of the zero figure of merit less critical; for example, one of the many other possibilities is to use two different metals in the construction of the sleeve, e. g. the lower portion of the sleeve may be made of copper, and the upper portion of brass.

In the modification shown in Figure 5 which is a sectional elevation showing one side of the chamber to be controlled together with the thermometer control member and associated heaters, 2 is the chamber wall, 3 the normally provided heater mat arrangement, and 4 the thermometer. Control of the figure of merit is, however, obtained by adjusting—for example by means of a rheostat (not shown) the heating current fed to a small auxiliary heater 9 located adjacent the thermometer. The expedient for controlling figure of merit exemplified by Figure 5 may be used in place of or in conjunction with the expedients exemplified by the other figures; that is to say the auxiliary adjustable heater 9 may be provided in place of or as well as providing a container within which the thermostatic control member is adjustably mounted. Also the effect of the heater 9 upon the thermostatic control member may be arranged to be adjusted otherwise than by varying its heater current; for example, the heater 9 may be movable with respect to the thermostatic control member or may itself be adjustably mounted in a container.

The invention is, of course, not limited to the use of mercury and glass thermostatic control members, i. e., thermometer switch control members, and other known thermostatic control members may be used in similar manner; e. g. bi-metallic strip control members may be used.

Having now particularly described and ascertained the nature of my said invention and in what manner the same is to be performed, I declare that what I claim is:

1. A thermostatically-controlled apparatus in which the temperature-responsive member by which the thermostatic control is effected is mounted in a tubular metallic container, a heater surrounding said container, the lower portion of said container being of a metal of high thermal conductivity and the upper portion of another metal having a low thermal conductivity, said container being in good thermal contact relationship with the heat-conducting walls of a chamber whose temperature is to be controlled, said temperature-responsive device being adjustably mounted in said tubular metallic container, that it may be moved from a portion having a lower or higher thermal conductivity to provide adjustment of the said apparatus.

2. A thermostatically-controlled apparatus in which the temperature-responsive member by which the thermostatic control is effected is mounted in a tubular metallic container, a heater surrounding said container the lower portion of said container being of a metal of high thermal conductivity and the upper portion of another metal having a low thermal conductivity, said container being in good thermal contact relationship with the heat-conducting walls of a chamber whose temperature is to be controlled, said temperature-responsive device being adjustably mounted in said tubular metallic container that it may be moved from a portion having a lower or higher thermal conductivity to provide adjustment of the said apparatus, and an auxiliary heater adjacent to and partly surrounding the walls of said metallic container, said temperature-responsive member mounted in a gap formed by said first mentioned heater to provide for heating the chamber to be controlled.

3. A thermostatically-controlled device comprising a metallic chamber, a heater surrounding said chamber, a mercury contact thermometer having a bulb portion adjacent said chamber, a metallic sleeve surrounding the bulb portion of said contact thermometer, said sleeve being in two portions, one portion being of a metal having a different thermal conductivity from the other portion of said sleeve and means for controlling the temperature of said device by changing the position of the bulb portion within said metallic sleeve from a portion having a lower or a higher conductivity.

4. A thermostatically-controlled device comprising a metallic chamber, a heater surrounding said chamber, a mercury contact thermometer having a bulb portion adjacent said chamber, a metallic sleeve surrounding the bulb portion of said contact thermometer, said sleeve being divided in two portions with metals of different thermal conductivity, the upper portion being of brass and the lower portion being of copper and means for controlling the temperature of said device by changing the position of said bulb portion within said metallic sleeve from a portion having a lower or higher thermal conductivity.

HAROLD JOSEPH HUGHES WASSELL.